LETTERING DEVICE

Filed April 4, 1967

INVENTOR.
JERRY K. GREGSTON
BY
MARCUS L. BATES

United States Patent Office 3,359,641

Patented Dec. 26, 1967

3,359,641

LETTERING DEVICE

Jerry K. Gregston, 3609 Brentwood, Odessa, Tex. 79760

Filed Apr. 4, 1967, Ser. No. 628,392
7 Claims. (Cl. 33—23)

ABSTRACT OF THE DISCLOSURE

A compact lettering device especially adapted for making uniform letters, numerals, and the like that includes a base, a rotatable disk carrying indicia stamped thereon, or engraved about the outer marginal edge thereof, with disk cooperating with the base to position any selected letter adjacent a lettering guide pen staff. The pen staff has a bifurcated end that cooperates with the central axis of the disk and includes a free end which carries an ink pen, with a lettering guide located between the ink pen and the bifurcated end. The lettering guide is adjustable to permit selection from an infinite number and size of letters. The disk may be scribed or engraved on both sides to permit reversal of parts to thereby enable both right and left handed people to use the device.

*Background of the invention*

Lettering guides are known in the art. Most draftsmen are familiar with lettering devices such as the Leroy, wherein an elongated rectangular member having letters scribed or engraved on the surface thereof is used in conjunction with a specially designed pen staff to thereby enable inking of various indicia for high quality drafting work. Lettering devices of the prior art generally require a separate lettering pattern for each size indicia desired. Furthermore, lettering guides of the past art generally require considerable longitudinal shifting of the lettering guide in selecting the proper indicia that is next to be reproduced.

*Summary of the invention*

The present invention comprises a lettering device which is especially adapted for drawing various indicia in a reproducible and artistic manner that resembles printing. The device is comprised of a base that rotatably receives a disk. The disk is held rotatably captive by a centrally located shaft with the shaft also cooperating with a pen guide staff. The pen guide staff includes a bifurcated end, a free end, and an adjustable slotted guide means located therebetween. The adjustable guide means enables selection of an infinite size of letters.

The rotatable disk and portions of the adjustable guide are reversible to enable both right-handed and left-handed people to realize maximum benefit from the invention. The base of the device is provided with legs to prevent interference with wet ink. A ratchet means cooperates with the outer peripheral edge portion of the disk to maintain the disk releasably locked in indexed relationship with the remainder of the device. The indicia is formed in a grooved manner to thereby enable the pen of the guide to follow the indicia.

Accordingly, a primary object of this invention is to provide a lettering device that can be manipulated in a manner to provide an infinite size of letters.

Another object of this invention is the provision of a lettering device having multiple rows of indica thereon that can be uniformly reproduced in an artistic and pleasing manner.

Another object of this invention is the provision of a lettering device which is compact in size, low in cost, and which provides an artist or draftsman with a multitude of reproducible indicia.

A still further object of this invention is the provision of a lettering device having reversible parts associated therewith to enable right or left handed people to use the device.

An important object of this invention is the provision or a lettering device having a pen guide staff associated therewith that enables the pen guide staff to adjustably cooperate with other portions of the device in a manner to reproduce varying size of the indicia associated therewith.

The above objects of the present invention are attained by the provision of a circular disk having indicia thereon with the disk being held captive to a base by a centrally located shaft that also serves as a journaled means for a pen guide staff. The pen guide staff cooperates with the disk and includes an adjustable guide means that cooperates with the indicia of the disk to thereby provide selection of an infinite size of letters.

*Brief description of the preferred embodiment*

Figure 1:
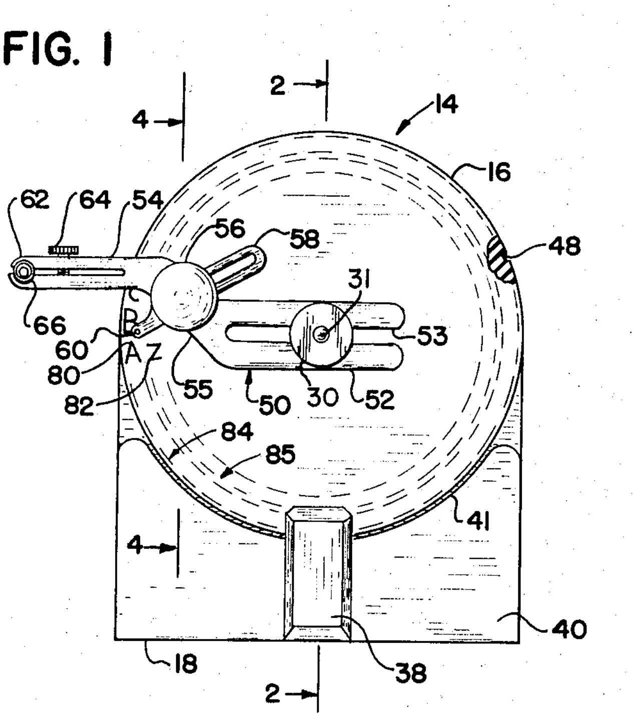
FIGURE 1 is a top plan view of the present invention with some parts being shown in section.

Looking now to the details of the drawings, there is seen disclosed therein the assembled lettering device generally illustrated by the arrow at numeral 14. The device includes a rotatable member or disk 16 secured to a base 18, and a central aperture 20 extending through the disk and base. The disk is rotatably journaled to the base by the illustrated shaft means 22 that includes an enlargement 24 to provide a reinforced lower bearing surface. A circular disk of "Teflon" 25 is provided adjacent the disk in the illustrated manner. The shaft means includes a threaded depending end 26 to which there is removably secured an elongated member having a flange 28 circumferentially depending therefrom. A spaced apart second flange 30 together with the before mentioned flange 28 provides an upstanding axle or annulus, the purpose of which will be pointed out in greater detail later on. A centrally depending nipple is seen at 31. Suitably disposed between the disk and the base is a sheet of Teflon 32 which provides low friction engagement of the parts. The backplate 34 has a protuberance or leg 36 that maintains the major portion of the device free of its supporting surface. An island 38 overlies the disk 16 and is integral part of the platform 40 that defines the upper face of the base. The platform is arcuate shaped at 41 and is made into essentially the same configuration or the same curvature as the before mentioned disk 16. The island 38 together with the base and platform is provided with a passageway 42 which receives biasing means 44, in the form of a spring, that urges a reciprocating member 46 into releasable engagement with a multiplicity of dimples 48. The dimples are located about the outer peripheral edge portion of the disk 16.

A pen guide staff member 50 includes a bifurcated end 52 with the bifurcation being formed by the longitudinally extending slot 53, with the opposite free end of the member forming a pen holder at 54. The bifurcated end and the pen holder end are joined by the central or upwardly curved staff portion 55. Central portion 55 includes a friction lock 56 for adjustably maintaining the adjustable guide means 58 attached thereto. A guide pen 60 is provided at the free end of the adjustable guide. A friction lock 64 releasably secures a writing means in the form of an ink pen 66 removably affixed to the free end of the pen staff.

The adjustable guide means 58 is held captive by the elongated longitudinally extending slot which is secured to the central portion 55 of the before mentioned pen guide staff by means of a screw 70. The screw 70 extends through the slot and includes a spacer 72 which cooperates with the before mentioned friction lock 56 to thereby adjustably secure the adjustable guide means locked to the upwardly curved portion of the staff member.

The disk of the illustrated embodiment is provided with two rows of indicia or letters on the either side of its face. The configuration of the letters 80 with respect to the letters 82 are different since the guide pen 60 must trace either letter 80 or 82, with either of the letters being reproduced identically in size with respect to each other. Accordingly, the difference in the linkage between letter 80 and the journaled pivot point at 22 with respect to letter 82 and the journaled pivot point 22 must be compensated in the illustrated manner by the difference in the configuration of the first letter 80 with respect to the second letter 82.

Figure 3:
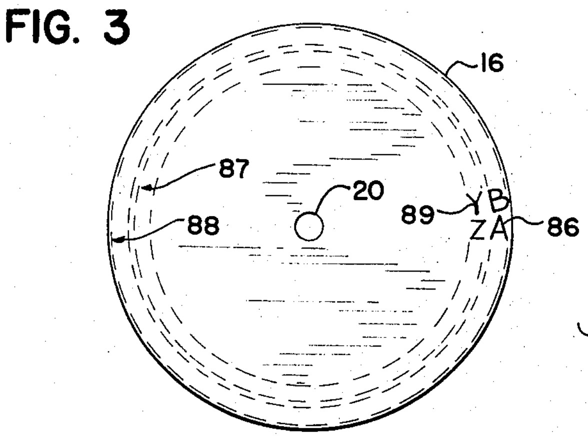
FIGURE 3 is a top plan view of the opposite side of part of the device seen in FIGURES 1 and 2.

FIGURE 3 illustrates the opposite side of the disk 16 as seen in FIGURE 1. The disk illustrated in FIGURE 3 is fabricated for left-handed people and includes a first letter 86 which corresponds to the before described letter 80 and a second letter 89 which corresponds to the letter seen at numeral 82. The letters at 89 circumferentially extend about the marginal edge portion of disk 16 in a manner indicated by the arrow at numeral 87. The letters at numeral 86 continue about the circumferential marginal edge portion of the disk 16 in a manner indicated by the arrow at numeral 88.

Figure 5:
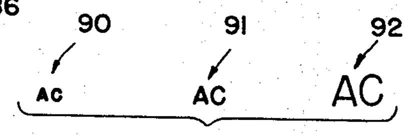
FIGURE 5 illustrates various size indicia that can be drawn with the device illustrated in FIGURES 1 through 4.

FIGURE 5 illustrates three pairs of letters with the letter at numeral 90 being drawn with the device of FIGURE 1 adjusted to the minimum size, the letter at numeral 91 being drawn wherein the device is adjusted to an intermediate size, and the letter at numeral 92 being drawn with the device adjusted to the maximum size.

Figure 6:
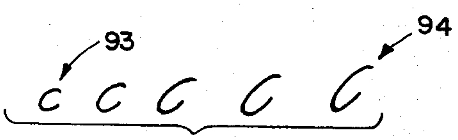
FIGURE 6 illustrates different size and configuration of indicia which may be drawn with the device illustrated in FIGURES 1 through 4.

FIGURE 6 illustrates a series of numerals wherein the adjustable guide 58 has been adjusted to provide a small slanted letter at numeral 93, a large slanted letter at 94, with varying sizes therebetween.

*Operation*

Figure 2:
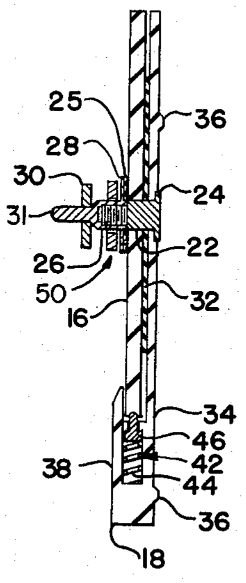
FIGURE 2 is a cross-sectional view taken along line 2—2 of FIGURE 1.

In operation, the device is assembled as illustrated in FIGURES 1 and 2, which is the most desirable configuration for right handed people. Where a left handed person is using the device, reassembly into the lefthanded configuration is required. This device is disassembled by removing the friction lock 56 that in turn permits the screw 70 to be withdrawn from the upwardly curved staff portion 55 and adjustable guide 58. The pen guide staff 50 is removed from the device by merely sliding the bifurcated end 52 out of the annulus formed between the flanges 28 and 30. The disk 16 is removed by unscrewing the upper portion of the bearing member by applying rotational pressure to flange 30 whereupon the shaft portion 22 can be separated from the remainder of the device. The disk 16 may now be slipped upwardly and outwardly of the device, with the spring 44 and ratchet 46 remaining within the passageway 42. The disk 16 is reversed, or turned upsidedown, and replaced under the island 38 with the ratchet 46 being compressed against spring 44. The shaft 22 is replaced in the illustrated manner, and the flange 30 is screwed back onto the shaft 22 by means of threads 26.

Figure 4:
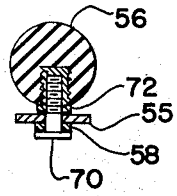
FIGURE 4 is a partial cross-sectional view taken along line 4—4 of FIGURE 1, and showing part of the device seen in FIGURE 1.

The pen guide staff 50 is next reassembled by reversing the relationship of member 50 by turning the member over from left to right. The adjustable guide 58 is replaced by reassembling the friction lock illustrated in FIGURE 4. The friction lock assembly now upwardly depends from the portion 55 which is now the reverse side of the illustration of FIGURE 1. The ink pen 66 is replaced in the ink pen holder by means of the friction lock 64. The device is now in assembled condition for left handed people to use, with the pen 66 being positioned to the right of the disk 16.

When drawing letters, the base 18 is best placed adjacent a T-square or the like to thereby provide a horizontal guide for the device. The disk 16 is rotated into position to selectively place the desired indicia adjacent to pen 60. The pen 60 accordingly traces any of the indicia located about the marginal edge of the disk at 84, 85, 87, or 88, by merely positioning the desired indicia adjacent the pen 60. This operation is well known in the art, and therefore will not be described in detail. After the desired indicia has been traced, the next desired indicia is brought into proper position by rotating the disk 16. As the disk 16 is rotated, the ratchet 46 maintains the indicia properly indexed with respect to the pen 60 by means of the releasable latch assembly at 42.

The size and configuration of the indicia may be selected by adjusting the adjustable guide means 58 in a manner to change the linkage between the guide pen 60 and the journal formed at the annulus at flange 30. For example, release of friction lock 56 permits the adjustable guide 58 to be rotatably pivoted about screw 70 as well as enabling the guide means to be longitudinally extended or reciprocated within the limits of the illustrated slot seen near the numeral 58. Extension of the adjustable guide 58 to the opposite extremity of that illustrated in FIGURE 1 will lengthen the moment arm between pen 60 and journal or annulus at flange 30, while at the same time shortening the linkage between guide pen 60 and writing pen 66. Accordingly, this operation will provide a small letter. Adjustment to the opposite extremity will provide a large letter since the relationship or ratio of the linkages are reversed. Rotation of the adjustable guide 58 in either direction will also change the appearance of the letter. Furthermore, when the letter is traced with the disk being offset from the position of FIGURE 1 enables the letter to be slanted either to the left or to the right. Accordingly, within the maximum and minimum limits of the particular position of the device, there is an infinite number of adjustments which are possible with the device that in turn will enable an infinite size and configuration of letters to be traced.

The configuration of the indicia 80 with respect to the indicia of the letter 82 must be made to compensate for the difference in linkage between the pen 60 and the axle or annulus at flange 30. Otherwise, adjacent letters that are located in the circular row 84 when compared to the letters located in circular row 85 will be different in size, and accordingly the letters of one row will not be uniform with respect to letters of an adjacent row. Therefore, the letters in adjacent rows must be cut into the surface of the disk 16 in a manner generally illustrated at 80 and 82 to thereby enable two letters of adjacent rows to be utilized in the illustrated manner with the resultant printing being uniform in size regardless of the row from which the indicia is selected.

The purpose of the legs or protuberances 36 is to maintain the device spaced apart from the work sheet to thereby preclude the possibility of smearing the ink as the work is carried out.

The details of ink pen 66 have not been described since it is within the comprehension of those skilled in the art to provide the device with suitable ink pens of varying designs as well as pencil points and the like.

Accordingly, while I have shown and described a specific embodiment of my device, the means by which the present invention can be practiced is not to be construed as being limited to the foregoing portion of my disclosure, but rather is to be considered only in light of the appended claims. Therefore, what I deem to be the metes and bounds of my intellectual property is set forth in the following claims.

I claim:

1. A lettering device having a pen guide staff; a writing means, a guide pen, and a journaled means associated with said pen guide staff; a member having indicia formed thereon, the improvement comprising:

said member having indicia thereon including a rotatable member having a centrally located bearing means that is adapted to cooperate with said journaled means of said pen guide staff to thereby enable said guide pen to trace said indicia;

said journaled means being received by said centrally located bearing means, with said writing means spaced apart from said member to thereby permit said guide pen to trace said indicia; whereby:

rotation of said rotatable member selectively positions said indicia adjacent said guide pen to thereby enable predetermined indicia to be reproduced at a point spaced apart from said indicia.

2. The improvement of claim 1, wherein said member having indicia thereon further includes a first row of indicia and a second row of indicia;

said first row of indicia being circumferentially disposed about the marginal edge portion of said member;

said second row of indicia being circumferentially disposed about the marginal edge portion of said member and adjacent to and spaced apart from said first row;

means forming the indicia of said first row into a size and configuration with respect to the indicia of said second row; whereby:

indicia of said first and second row that is reproduced by said writing means forms letters of the same relative size.

3. The improvement of claim 1, wherein said centrally located bearing means includes an upstanding axle and said pen guide staff includes an end carrying said journaled means, an end carrying said writing means, and a central portion therebetween;

said journaled end including spaced part legs formed by a slot with the slot adapted to removably receive said axle in close tolerance fitting relationship therewithin; and said guide pen includes means affixing it to said central portion.

4. The improvement of claim 3 wherein said means affixing said guide pen to said central portion includes an adjustable member having means forming a longitudinally extending slot at one end with said guide pen being disposed at the opposite end;

adjustable attachment means carried by said central portion and received through said slot; whereby:

said attachment means permits said guide pen to be pivoted about said attachment means as well as permitting said guide pen to be extended or retracted with respect to said central portion.

5. The improvement of claim 1, wherein said member having indicia thereon includes a base, a platform, an island, and a centrally apertured disk with said disk bearing the recited indicia;

said bearing means extending through said base and received by said aperture and including a depending portion extending free of said bearing means with said depending portion incluing spaced apart flanges forming an annulus that provides an axle; whereby:

said island overhangs said disk;

said disk is held rotatably captive by said bearing means, axle, and island.

6. The improvement of claim 5 wherein said disk includes means forming spaced apart dimples about the edge portion thereof with said dimples being indexed with said indicia;

said island, platform, and base having means forming a passageway radially aligned with said disk;

a biased plunger in said passageway aligned with one dimple; whereupon:

the disk is releasably held in indexed relationship with respect to the guide pen and indicia adjacent thereto.

7. The improvement of claim 1 wherein said member having indicia thereon further includes a first row of indicia and a second row of indicia;

said first row of indicia being circumferentially disposed about the marginal edge portion of said member;

said second row of indicia being circumferentially disposed about the marginal edge portion of said member and adjacent to and spaced apart from said first row;

means forming the indicia of said first row into a size and configuration with respect to the indicia of said second row whereupon indicia of said first and second row that is reproduced by said writing means forms letters of the same relative size;

said member having indicia thereon includes a base, a platform, an island, and a centrally apertured disk with said disk bearing the recited indicia;

said bearing means extending through said base and received by said aperture and including a depending portion extending free of said bearing means to form an axle including spaced apart flanges on said axle forming an annulus that forms a part of the before recited bearing means;

said island overhangs said disk;

said disk is held rotatably captive by said bearing means, axle, and island;

said disk includes means forming spaced apart dimples about the edge portion thereof with said dimples being indexed with said indicia;

said island, platform, and base having means forming a passageway radially aligned with said disk;

a biased plunger in said passageway aligned with one dimple whereby the disk is releasably held in indexed relationship with respect to the guide pen and indicia adjacent thereto;

said means affixing said guide pen to said central portion includes an adjustable plate having means forming a longitudinally extending slot at one end with said guide pen being disposed at the opposite end;

adjustable attachment means carried by said central portion and received through said slot; whereby:

said attachment means permits said guide pen to be pivoted about said attachment means as well as permitting said guide pen to be extended or retracted with respect to said central portion.

No references cited.

HARRY N. HAROIAN, *Primary Examiner.*